(12) United States Patent
Filippenko et al.

(10) Patent No.: US 6,370,957 B1
(45) Date of Patent: Apr. 16, 2002

(54) VIBRATION ANALYSIS FOR PREDICTIVE MAINTENANCE OF ROTATING MACHINES

(75) Inventors: Alexander Filippenko, Apex; Scott Brown, Wake Forest; Alan Neal, Morrisville, all of NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/477,044

(22) Filed: Dec. 31, 1999

(51) Int. Cl.[7] .................. G01H 1/06; G01M 13/00
(52) U.S. Cl. ................. 73/660; 73/593; 73/659
(58) Field of Search .................. 73/593, 659, 660, 73/661

(56) References Cited

U.S. PATENT DOCUMENTS

| | | | |
|---|---|---|---|
| 4,262,538 A | * 4/1981 | Otawara | 73/593 |
| 4,352,293 A | * 10/1982 | Kurihara et al. | 73/593 |
| 4,425,798 A | * 1/1984 | Nagai et al. | 73/659 |
| 4,453,407 A | * 6/1984 | Sato et al. | 73/660 |
| RE31,750 E | * 11/1984 | Morrow | 73/659 |
| 4,493,042 A | 1/1985 | Shima et al. | 73/593 |
| 4,763,523 A | 8/1988 | Womble et al. | 73/587 |
| 4,790,190 A | 12/1988 | Bambara et al. | 73/660 |
| 4,980,844 A | * 12/1990 | Demjanenko et al. | 73/660 |
| 5,109,700 A | 5/1992 | Hicho | 73/660 |
| 5,115,671 A | 5/1992 | Hicho | 73/488 |
| 5,140,858 A | 8/1992 | Nishimoto et al. | 73/587 |
| 5,150,618 A | 9/1992 | Bambara | 73/660 |
| 5,187,434 A | 2/1993 | Ando | 73/660 |
| 5,381,692 A | 1/1995 | Winslow et al. | 73/593 |
| 5,477,730 A | 12/1995 | Carter | |
| 5,495,764 A | 3/1996 | Matsuzaki et al. | 73/593 |
| 5,811,683 A | 9/1998 | Yoshioka et al. | 73/660 |
| 5,852,351 A | 12/1998 | Canada et al. | |
| 5,889,218 A | 3/1999 | Sato et al. | 73/593 |
| 5,929,336 A | 7/1999 | Belanger et al. | 73/593 |
| 5,998,894 A | 12/1999 | Raad | 73/593 |
| 6,116,089 A | * 9/2000 | El-Ibiary et al. | 73/593 |

* cited by examiner

Primary Examiner—Hezron Williams
Assistant Examiner—Rose M. Miller
(74) Attorney, Agent, or Firm—David R. Stacey; Larry T. Shrout; Larry I. Golden (57) ABSTRACT

A method for determining the operational condition of a rotary machine is disclosed. The method comprises the steps of monitoring the machine under a baseline operating condition and collecting baseline vibrational data. A preselected number of baseline parameters are calculated from the baseline vibrational data. Next, a first baseline operational indicator is calculated from the baseline parameters, and the baseline parameters and the first baseline operational indicator are stored in a memory location. The machine is then monitored under a subsequent operating condition, and subsequent vibrational data is collected during the subsequent operating condition. A preselected number of subsequent operating parameters is calculated from the subsequent vibrational data, and a first subsequent operational indicator is calculated from the preselected number of subsequent operating parameters. Finally, the baseline data is compared to the subsequent operating data to determine the condition of the machine.

19 Claims, 5 Drawing Sheets

VIBRATION ANALYSIS FOR PREDICTIVE MAINTENANCE OF ROTATING MACHINES

TECHNICAL FIELD

This invention relates generally to vibration analysis for the proactive maintenance of rotating machines.

BACKGROUND OF THE INVENTION

A running motor is a source of vibration. As a motor wears, the vibration level tends to increase. This vibration can be monitored to determine the relative health of that motor and schedule preventive maintenance procedures.

The vibration of a motor occurs over a relatively wide frequency band from low frequencies to higher frequencies. Different problems in a motor (and its load) cause different types of vibration. For instance, rotor imbalance produces an increase in the radial vibration spectrum at 1× speed of rotation (first order). Bearing problems usually create an increase in vibration energy at higher frequencies. These higher frequencies are typically in the range of ten times the rotation speed and higher.

A major concern in proactive maintenance is the early detection of bearing rolling element failure. Vibration related to worn bearings usually is created by the multiple impact of metal bearing parts. Accurate analysis of the structure of a bearing provides values of frequencies for each type of defect (inner race, outer race, rolling element, etc.). Calculating the various bearing frequencies also requires information that is typically unknown, for example: inner and outer race diameter, ball size and number of balls. To complicate matters, a bearing manufacturer may change the internal design of a bearing without changing the specifications. They guarantee only the external parameters (size, maximum speed and load). Thus, the methods of vibration monitoring based on the knowledge of exact structure of the bearings could be used only for limited area of applications.

Consequently, a need still exists for a universal monitoring device utilizing a common, statistic-based algorithm that is not limited by particular type of machine, but uses general vibration properties common to all kinds of rotating machines.

SUMMARY OF THE INVENTION

The purpose of this invention is to develop a method of monitoring a rotating machine using the vibration signal and a variety of the digital signal processing methods.

To facilitate detection of the mechanical defects the motors mechanical vibration is converted to the electrical analog signal by a piezoceramic sensor, and then, after preconditioning, is converted to digital form.

The preconditioning of the signal consist of anti-alias filtering and preamplifying. The anti-alias filter has a cutoff frequency of 5 kHz, the high limit of the sensor frequency band is 10 kHz. The sampling rate of the applied 14-bit AD converter is 20 kHz. The collected data is recorded into a memory to be used for calculations.

The present invention utilizes collected vibration data to calculate a set of statistical parameters of vibration such as root mean square (RMS), kurtosis (KU), crest factor (CF), high frequency enveloping (HFE), as well as trending of the mean values of the selected areas of averaged spectra. The combination of the values is used for the calculation of two general output values characterizing a mechanical condition of the rotating machine. The first said value corresponds to the overall condition of the machine and the second value corresponds to the condition of the bearings. The second value may be used also to detect other mechanical problems characterized by the metal-to-metal impacts. Thus, the output of the method contains not only the set of data for the following analysis, but also a direct indication as to what has happened to the machine being monitored.

DETAILED DESCRIPTION OF THE INVENTION

While the invention is susceptible of embodiment in many different forms, there is shown in the drawings and will herein be described in detail a preferred embodiment of the invention. It is to be understood that the present disclosure is to be considered only as an example of the principles of the invention. This disclosure is not intended to limit the broad aspect of the invention to the illustrated embodiment. The scope of protection should only be limited by the accompanying claim.

The present invention provides a method for scheduling proactive maintenance on machines with rotating parts. The method uses collected vibration data to calculate a set of statistical parameters of vibration such as root mean square (RMS), kurtosis (KU), crest factor (CF), and high frequency enveloping (HFE), as well as trending of the mean values of the selected areas of averaged spectra. The combination of the parameters are used to calculate the two output values which characterize a mechanical condition of a rotating machine. The present invention is particularly useful in the monitoring of mechanical conditions of rotating machines, including electric motors, gas and fluid turbines, pumps, fans, axle bearing in trains, shafts in ships and the like.

A first output value corresponds to the overall condition of the machine; i.e. vibration. A second output value corresponds to the condition of the machines bearings; i.e. bearing vibration. The second value may also be used to detect other mechanical problems, such as those characterized by metal-to-metal impacts. Thus, the method yields a direct indication of the relative state of the tested machine.

Crest factor (CF) is a traditional method of measuring the smoothness of vibration signal. CF is the peak vibrational signal value divided by the root mean square (RMS) value. A faulty bearing generates a spiky vibrational signal profile. This results from metal-to-metal impacts of bearing parts. Thus, CF increases as bearing problems become more severe. In the late stages of bearing failure, however, the RMS value also increases. This dramatically decreases the value of CF.

Another measure of smoothness is K-factor. K-factor is the product of RMS and peak vibration. The value of K-factor increases monotonically as bearing failure develops. K-factor contains a product of two values that rise as the speed of revolution rises. Thus, K-factor is highly dependent on the speed of rotation of the machine.

Generally, K-factor combines the same data as CF, RMS, and peak value of vibration. However, for the CF calculations, the peak vibrational value is divided by RMS. The rotational speed dependence is partially compensated while in the K-factor calculation, the peak vibrational value and RMS are multiplied, so the speed dependence is included in the resulting value. Thus, the CF for the late stages of bearing defects becomes lower because the overall vibration of the machine rises. Meanwhile, the K-factor increases.

Generally, the vibrational signature of a healthy machine exhibits a Gaussian or "normal" amplitude probability density. As the machine develops faults, the vibrational signal typically becomes non-linear in its amplitude response, and the machine begins to generate amplitude distribution signals that deviate from Gaussian. The signal spends a greater percentage of its time at higher amplitude levels, and the waveform becomes less smooth and more "spiky." The relationship between the actual distribution signal and the Gaussian vibrational signal is called kurtosis.

A well-known technique of extracting bearing related signals from the total vibrational signal is called high frequency enveloping (HFE). HFE extracts a high frequency (500–3000 Hz) part of the total vibrational signal and uses it to estimate a value of the bearing-related vibrations of the motor. Filtering of periodic components of the total vibrational signal improves detection of the bearing related signal.

Detection of the actual mechanical conditions of the motor is improved by saving of the initial mechanical condition data in a memory location. The actual mechanical conditions can be compared to the initial mechanical condition by a microprocessor to show any deterioration in the motor. For example, the changes in the actual data indicate the changing mechanical conditions of the motor. Such trending of motor vibration is a powerful tool for proactive maintenance.

Figure 3:
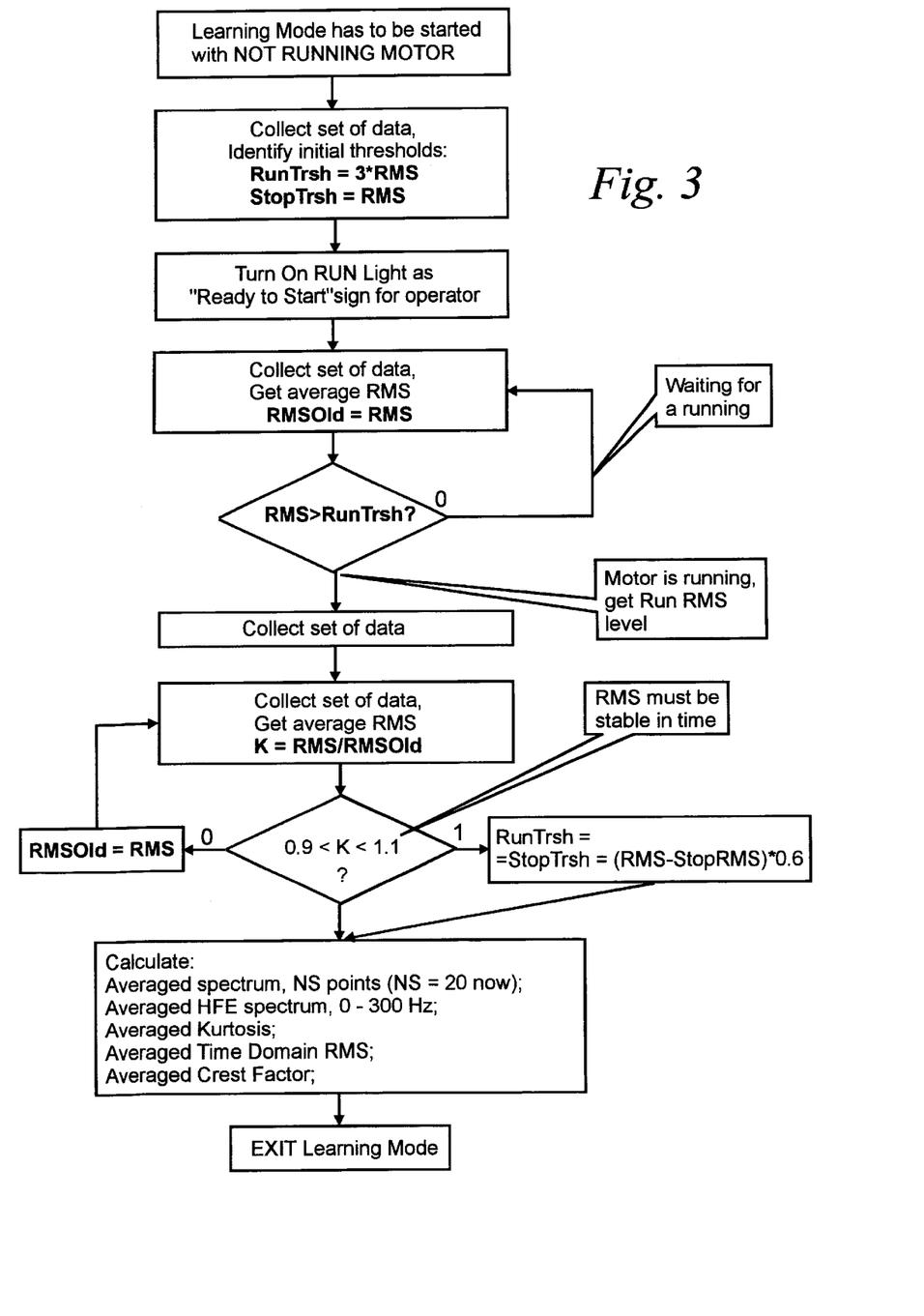
FIG. 3 is a flow chart of the learn mode of the method of the present invention.
Figure 4:
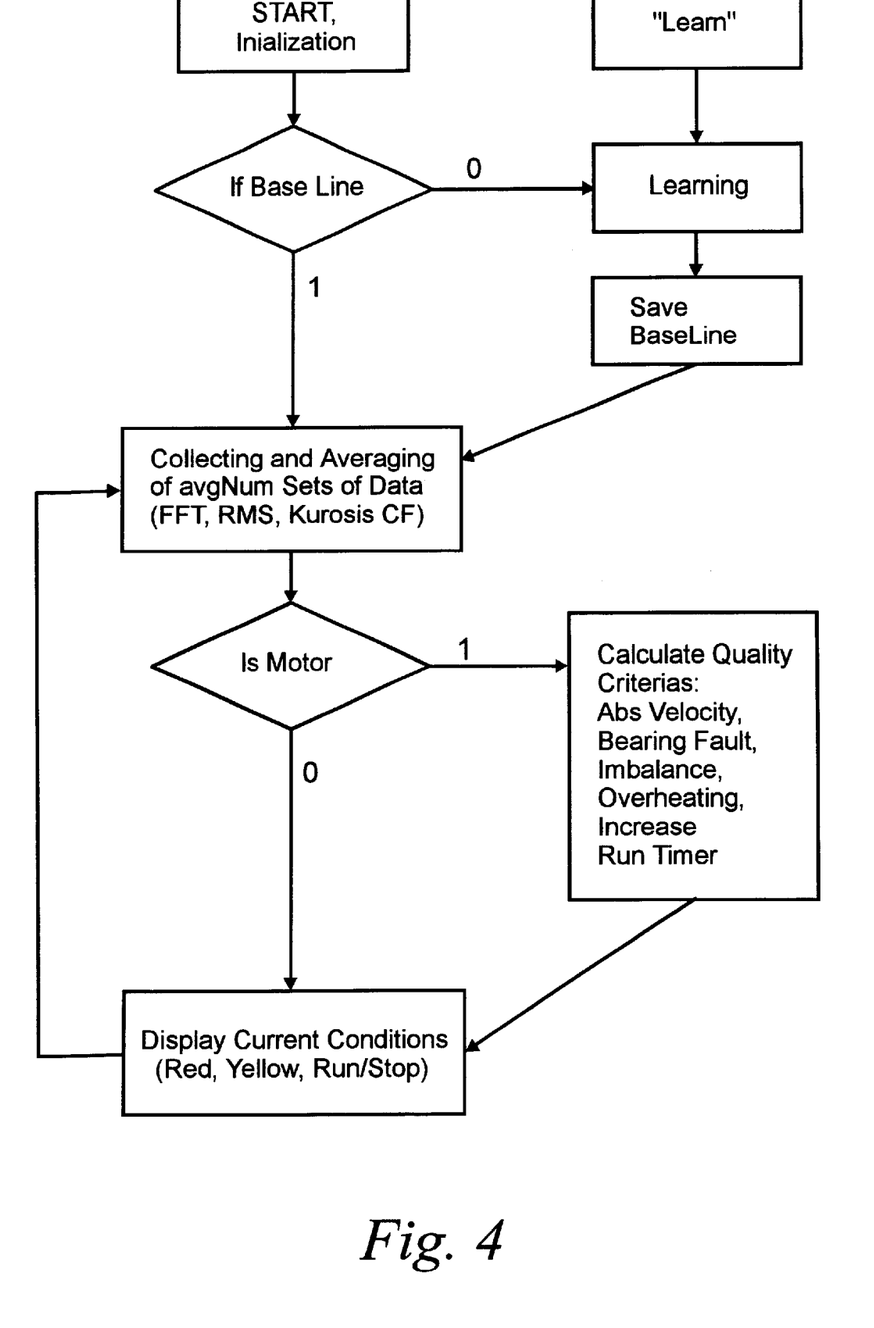
FIG. 4 is a flow chart of the method of the present invention.
Figure 5:
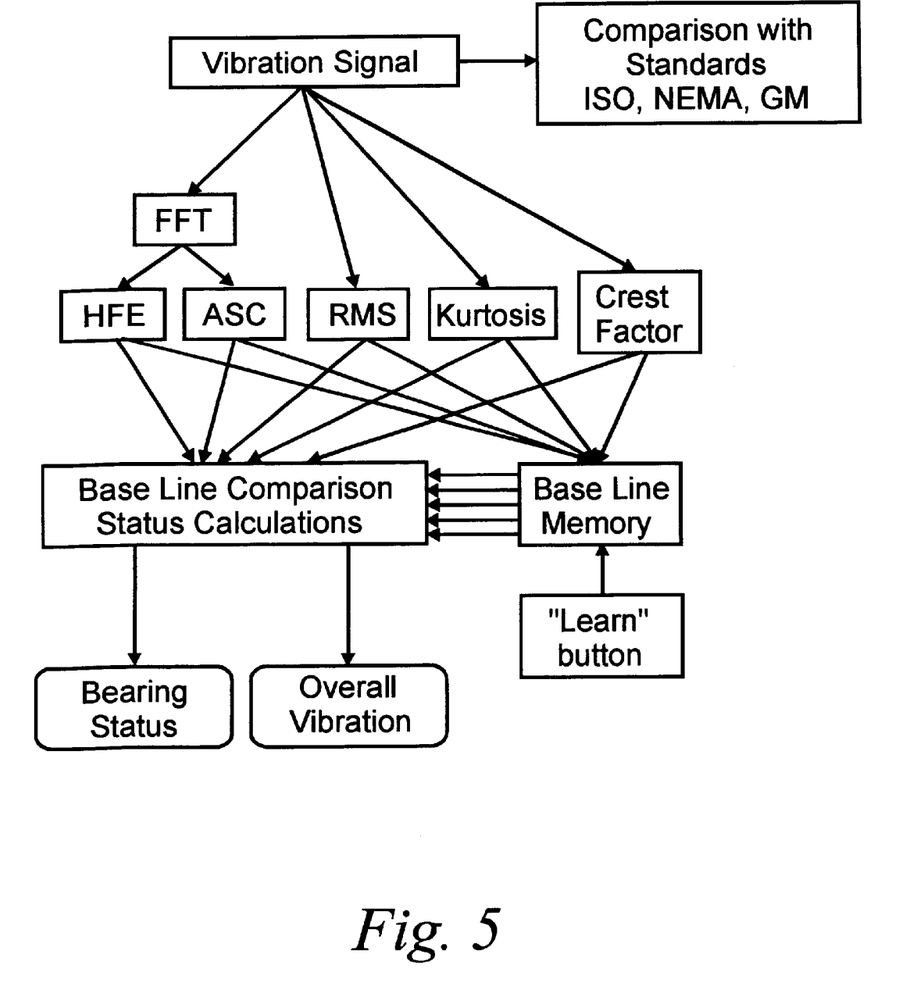
FIG. 5 is a flow chart of the interaction of the variables of the method of the present invention.

Machine monitoring is achieved through the use of the initial mechanical condition values or baseline data. (See FIGS. 3–5). The baseline date is a set of parameters characterizing the vibration of a monitored motor. The baseline data are collected during a learn mode (LM) when the motor is operating in a "healthy" condition.

The LM is a special mode of monitoring the machine. During LM, the initial vibrational data is collected, averaged, and saved for future use in the memory of a controller. The LM further comprises a calculation of thresholds for a run/stop condition detection. The LM is activated by pressing a learn button on the controller or programmatically by a demand from a host machine.

The collected vibrational data is transformed from the time domain to the complex frequency domain using fast Fourier transform (FFT) to a complex frequency domain using Hanning window. The results are then averaged.

The number of samples is determined by several factors. The first is necessity to have a long enough time for sampling. To have statistically reliable data, sampling time has to be at least 2–4 seconds. Such long sampling is generally not acceptable because of limited calculating power of known microprocessors, thus the shorter 0.2 sec. interval is used and then the averaging of the calculated values is done on 20 rows of samples to provide a signal to noise ratio improvement. The second factor is the calculation speed. Other factors include the necessity to use 16 or 32 bit memory to store the suns as averaging is taking place, and the number of samples required to have the data settle to an acceptable level.

The method of the present invention uses the following set of parameters as its basis. The values of the parameters are averaged to reduce the influence of noise.

Absolute Value of Vibration (mm/sec)

The measured value of the vibration spectrum is compared with the absolute value given in a standard, e.g., ISO, NEMA, or GM. A particular standard has to be selected over the network of choices. The detection method includes the step of generating a standard curve which is based on the selected standard and the generation of vibrational parameters applied to the given standard.

For example, for the GM standard, the standard curve is band-limited over all vibrational RMS limits. Warning and alarm thresholds are frequency dependent and are derived from the standards.

High Frequency Enveloping (HFE)

This parameter is used for selection of the bearing-specific part of the vibrational energy. The main steps of the HFE calculation are: 1) calculation of the spectrum of the vibrational signal; i.e., conversion to the frequency domain with FFT; 2) selection of the high frequency part of the vibrational spectrum (In tests, to achieve a reliable separation between imbalance-like and bearing-like sources of vibration; the lower limit of bearing-related frequency band was selected at 10–50 times higher than motor revolution speed. The upper limit depends on available hardware, set at 5 kHz for the tests described herein.); and 3) suppression of the obviously periodic components in the spectrum. This is accomplished by removing the predominant peaks in the spectrum. Removing these peaks improves the bearing signal to noise ratio because bearing vibration tends to be random rather than periodic.

Averaged Spectrum Changes (ASC)

To calculate ASC, the amplitudes of 2048 complex points of spectrum are averaged into 32 intervals. The resulting 32-point spectrum is used for trending of the motor vibration. This second averaging reduces the noise and improves the repeatability of data. The peak and average values of the resulting distribution are compared with baseline values saved during learn mode. The first value of the averaged spectrum (the sub-band corresponding to the lowest frequency of spectrum) is used to estimate the vibration energy of imbalance and misalignment type of motors problems. The ASC value is described by the expression:

$$ASC = \left(\prod_{i=0}^{N-1} \frac{Ai}{Bi}\right)^{1/N},$$

where Ai are magnitudes of the averaged spectrum, Bi are magnitudes of the averaged baseline spectrum, and N is the number of members in the averaged spectra. In the example disclosed herein N=32.

The geometric mean value is used to provide correct averaging of "ratio" values. For instance, the expected mean value for two numbers 10 and 0.1 is 1 (first one reflects 10 times increasing while second reflects 10 times decreasing, so averaging result expected is 1.0).

The Peak ratio is the ratio of the maximum magnitudes of the measured and baseline spectra.

$$PK = \frac{\max(Ai)}{\max(Bi)}.$$

Peak ratio is the value that corresponds to the changes of the low frequency part of the spectrum.

Kurtosis

The vibration of a healthy machine generally exhibits a Gaussian or "normal" amplitude probability density. As the machine develops faults it begins to generate amplitude distribution signals that deviate from Gaussian. The kurtosis calculation is a way to measure the deviation from the normal distribution which can be calculated in real time from the waveform. The kurtosis is a fourth central moment of the random distribution that by definition is calculated as:

$$Kurt = \frac{\sum (Xi - \mu)^4}{N\sigma^4} - 3,$$

where $\mu$ is the mean value, $\sigma$ is the standard deviation, and $Xi$; are magnitudes of the vibration time domain signal. Calculations are made on each row of samples (4096 points) and then averaged on 20 rows.

Low Frequency Absolute and Relative Changes

This parameter is used to detect imbalance and misalignment type problems. The first subband $A_0$ of the averaged acceleration spectrum covers at least three first orders of rotation frequency, 0–312 Hz. It covers a wide enough frequency band to cover the first few harmonics of the vibration signal. The averaged level of $A_0$ band is compared with the baseline value. Further, the ratio of $A_0$ to the average level of the spectrum is compared with the baseline. Machine imbalance increases the level of $A_0$ and also produces additional bearing noise. However, the increasing value of the ratio, $A_0$/(Mean Value) attributable to machine imbalance, is generally greater than the ratio attributable to bearing problems where the average level of spectrum grows relatively larger than $A_0$.

A warning alarm is set at twice the baseline value, and an alarm threshold is set at four times the baseline value. Thus, two parameters are defined—relative changes in magnitude in the low part of the spectrum (LFR) and absolute changes of magnitude of the low part of the spectrum (LFA):

$$LFR = \left(\frac{(A_0/B_0)}{ASC}\right),$$

$$LFA = \frac{A_0}{B_0},$$

where $A_0$ and $B_0$ are the first elements of signal and the baseline spectra respectively.

Acceleration RMS

RMS acceleration of the time domain signal is used to detect Run/Stop conditions and is used in the calculation of Crest Factor and K-factor. Run status is indicated when the RMS level exceeds a learned run threshold value (RunTrsh). The initial run threshold value is generally 3 times RMS. Thereafter, the run threshold is given by:

RunTrsh=StopTrsh+(RMS−StopRMS)×0.6.

The stop condition is detected when the RMS level drops below a stop threshold value (StopTrsh) which is generally equal to the initial value of RMS. The RunTrsh and StopTrsh thresholds are defined during the Learning Mode step.

$$RMS = \sqrt{\frac{\sum (Xi - \mu)^2}{N-1}},$$

where Xi is the vibration time domain signal, $\mu$ is the mean value, and N is the number of points.

Crest Factor

Crest Factor (CF) is a traditional way to detect bearing related problems. CF is the ratio of the peak to RMS in the time domain signal. This parameter typically drops as bearing problems become severe.

$$CrestFactor = \frac{\max(Xi)}{RMS}.$$

K-factor

K-factor is alternative method of detecting bearing problems. K-factor is the product of RMS and peak vibration in the time domain. This parameter continues to grow throughout the failure process of bearings.

Kfactor=RMS×max(Xi).

Velocity RMS

The RMS velocity parameter is calculated from the Frequency Velocity Spectrum (FVS) of the vibration as described in the ISO 10816, Annex A, (A.2). It must be calculated in specified frequency bands. GM specifies 6 bands.

Output Values

The vibration signal parameters described above can be separated into three groups: (1) parameters that change primarily when bearing-related noise takes place (e.g., crest factor); (2) parameters that change primarily when imbalance-related problems develop (e.g., Low Frequency changes); and (3) parameters that grow with any kind of problems.

The following parameters were analyzed and selected to calculate output values: crest factor, kurtosis, and LFR to characterize a bearing related vibration, and RMS, ASC, and Peak Value to characterize the overall vibration level.

Two output values were generated: bearing condition (BearingC) and overall vibration (OverAllVibr). The Baseline data are used in the calculation.

$$BearingC = \left(CFRatio \times \frac{(Kurt - KurtBaseLine + 1)}{LFR}\right)^{1/3},$$

where CFRatio is ratio of measured crest factor to the baseline crest factor.

The kurtosis value has an absolute value of 0 for Gaussian distributions and grows for spike-like types of vibration which are typical when bearing wear is present. In order to calculate kurtosis-related coefficients equal to 1 for normal conditions, the 1 is added in the formula.

OverAllVibration=(RMS×ASC×PK)$^{1/3}$.

A possible improvement of the method can be achieved by using weight power coefficients W1, W2, W3 from the output values above so that:

Output=($A^{W1} \times B^{W2} \times C^{W3}$)$^{1/(W1+W2+W3)}$.

For the method disclosed herein W1=W2=W3=1.0.

Experimental Results

The above-described parameters were evaluated on a collection of more than 400 files which contained vibration data from a Spectra Quest Test setup exhibiting different types of mechanical problems. The results of evaluation are collected in Tables 1–4. The parameters were calculated relative to the baseline. Kurtosis was measured directly.

Figure 1:
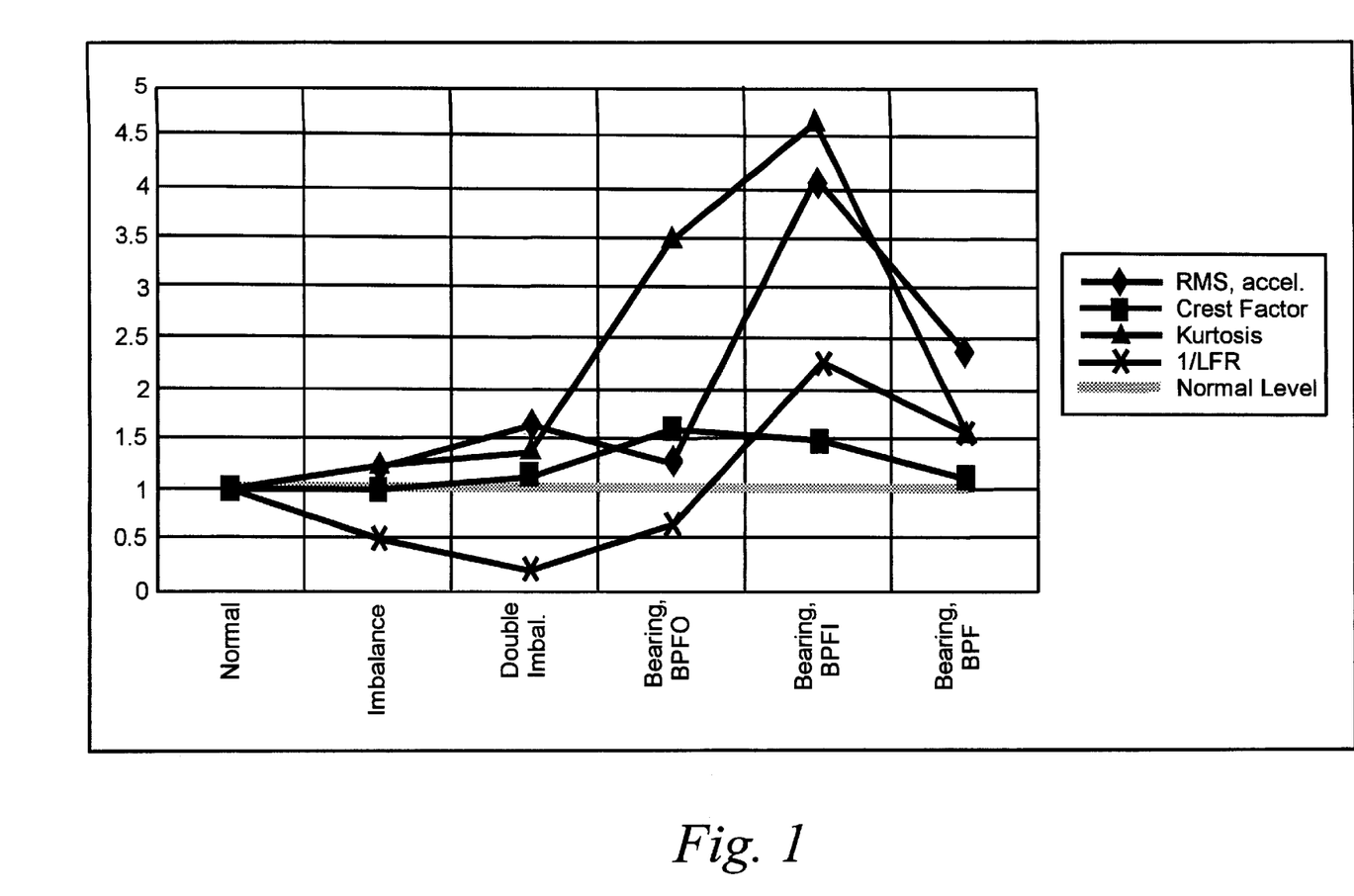
FIG. 1 is a graph of calculated preselected parameters under different operating conditions.
Figure 2:
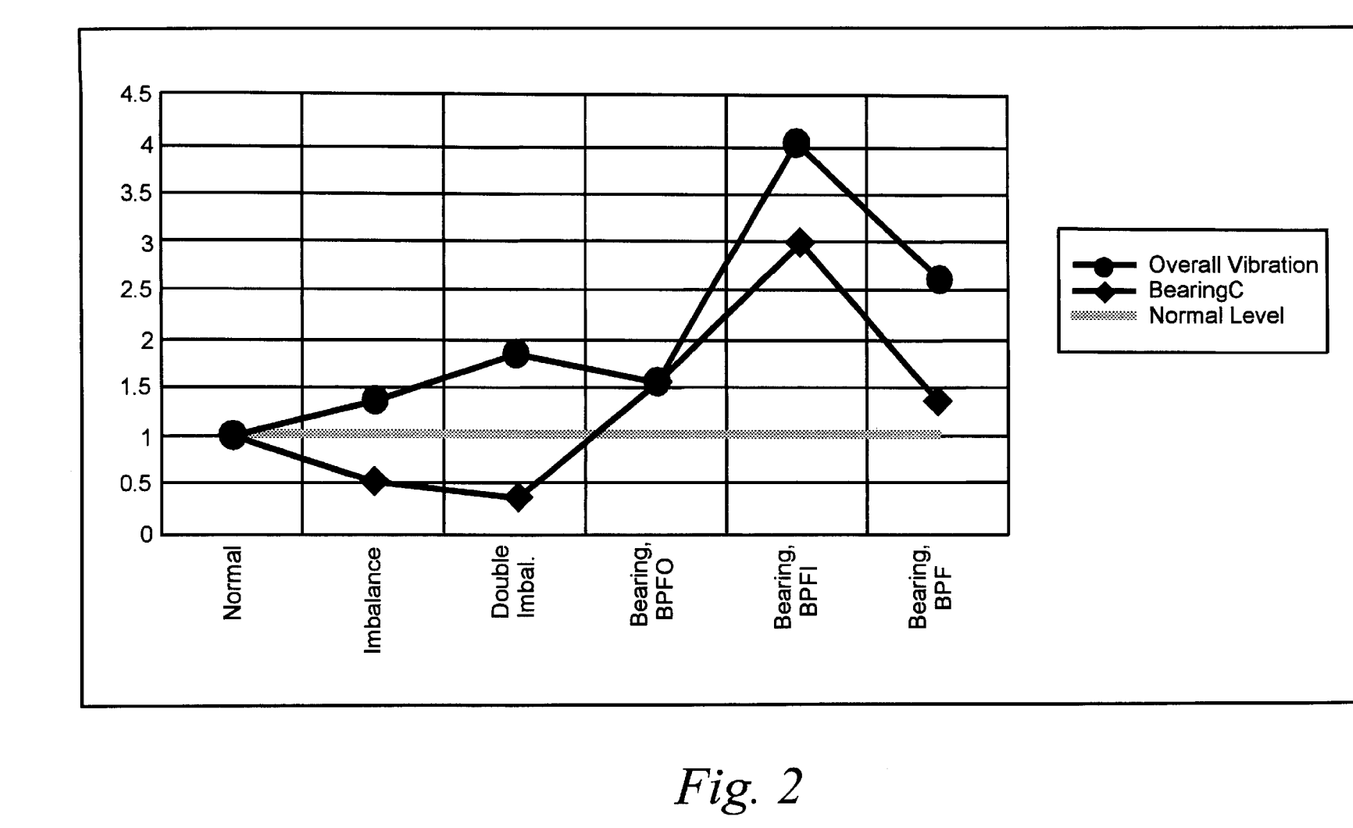
FIG. 2 is a graph of two output values calculated from the preselected parameters under a variety of operating conditions.

The baseline data was calculated for vibration samples collected from "normal" or healthy motors. Every parameter in Tables 1–3 is calculated as an average of 20 samples, 4096 points (0.2 sec) each. The plots of the parameters are shown in FIG. 1 and FIG. 2.

The following "defects" were modeled: (1) a small imbalance (one 5/16"x½41 bolt was installed on the motor's flywheel); (2) a strong imbalance (two 5/16"x½" bolts were installed on the same side of flywheel); (3) bearing with a defect on the internal ring (BPFI); (4) bearing with a defect on the external ring (BPFO); (5) bearing with a defect on the balls (BSF); (6) a bearing having a combination of BPFI, BPFO, and BSF defects; and (7) normal or healthy condition (baseline). The results of the algorithm were:

High Frequency Enveloping (HFE)

The HFE parameter showed significant dependence on changes of vibration. Imbalance as well as bearing vibration produced significant output in HFE which can be a result of metal-to-metal impacts excited by an unbalanced motor rotor. No distinct difference between imbalance and bearing related problems were noted.

The drawback with HFE is the large volume of calculations. In many cases, the volume of calculations is too large to be performed by a microcontroller system. Nevertheless, HFE can be a reliable indicator of the mechanical problems.

Averaged Spectrum Changes (ASC)

The ASC results showed a severe dependence on bearing-related as well as on imbalance-related problems. The typical increase of ASC for "bad" bearings is 3–4 times for 60–65 Hz and 2–3 times for 35 Hz revolution speed.

Acceleration RMS

RMS is a classic value calculated for vibration. Moderate changes in acceleration RMS (15%–80%) for bad bearings were observed.

Crest Factor (CF)

CF showed strong (2–8 times) increases for bearing-related defects and only minor changes for imbalance-related defects. The CF changes for strong imbalance conditions may also have been attributed to corresponding bearing vibration. In other words, strong imbalance can excite "jumping" of the bearing parts, so the vibration generated can contain some energy generated by "knocking" bearing parts and, thus, carry a bearing signature.

Low Frequency Relative Changes (LFR)

LFR showed a relative increase of the low frequency part of spectra when an imbalance developed. Thus, imbalance increased LFR 1.2–2 times while bad bearing conditions decreased the value of LFR at 20%–50%.

Low Frequency Absolute Changes (LFA)

LFR reflected relative changes of the low frequency part of spectrum. Bad bearing conditions produced smaller increases in LFA than imbalance conditions.

Kurtosis (KU)

KU showed strong increases resulting from the noise of bad bearing conditions. Values of KU remained low for imbalance related defects.

Output of the Method

The data collected at the experimental setup at 60 Hz revolution speed are shown in FIG. 2 and Table 4. The OverAllVibr1I value increased with any type of vibration. The value of BearingC increased for bearing-like vibration only and became significantly lower than 1 for imbalance-related problems.

The comparison of the spectra (HFE or ASC) was made by point-by-point division of the spectrum by the baseline spectrum and by using a geometric mean value to average the result. Geometric mean was necessary because the method involved averaging a ration of two spectra.

TABLE 1

Revolution Speed = 65 Hz

| 65 Hz | Normal | Small Imbalance | "Combo" | BSF | BPFI | BPFO | Strong Imbalance |
|---|---|---|---|---|---|---|---|
| HFE | 1.00 | 2.15 | 5.31 | 3.59 | 3.98 | 7.83 | 2.41 |
| Averaged Spectrum | 1.00 | 1.84 | 4.24 | 3.40 | 3.76 | 2.92 | 2.59 |
| Accel. RMS | 1.00 | 1.00 | 1.35 | 1.21 | 1.72 | 1.04 | 1.08 |
| Crest Factor | 1.00 | 0.98 | 2.44 | 2.00 | 2.00 | 2.84 | 1.00 |
| Low Freq. Rel. | 1.00 | 1.21 | 0.43 | 0.67 | 0.8 | 0.71 | 1.74 |
| Low Freq. Abs. | 1.00 | 1.69 | 1.25 | 1.28 | 2.3 | 1.25 | 3.16 |
| Kurtosis | 0.17 | 0.14 | 1.99 | 1.4 | 2.47 | 2.35 | 0.04 |

TABLE 2

Revolution Speed = 60 Hz

| 60 Hz | Normal | Small Imbalance | "Combo" | BSF | BPFI | BPFO | Strong Imbalance |
|---|---|---|---|---|---|---|---|
| HFE | 1.00 | 2.54 | 5.31 | 3.52 | 7.56 | 7.93 | 4.47 |
| Averaged Spectrum | 1.00 | 2.50 | 3.31 | 3.70 | 6.46 | 3.19 | 3.22 |
| Accel. RMS | 1.00 | 1.06 | 1.14 | 1.34 | 1.78 | 1.08 | 1.20 |
| Crest Factor | 1.00 | 0.96 | 2.52 | 2.84 | 7.28 | 9.08 | 2.32 |
| Low Freq. Rel. | 1.00 | 1.20 | 0.68 | 0.74 | 0.42 | 0.79 | 1.95 |
| Low Freq. Abs. | 1.00 | 1.88 | 1.63 | 1.66 | 1.49 | 1.48 | 4.50 |
| Kurtosis | −0.02 | 0.04 | 0.60 | 0.65 | 3.72 | 2.45 | 0.35 |

TABLE 3

Revolution Speed = 35 Hz

| 35 Hz | Normal | Small Imbalance | "Combo" | BSF | BPFI | BPFO | Strong Imbalance |
|---|---|---|---|---|---|---|---|
| HFE | 1.00 | 1.88 | 2.75 | 9.96 | 8.14 | 2.4 | 1.91 |
| Averaged Spectrum | 1.00 | 1.96 | 2.14 | 3.31 | 4.00 | 1.45 | 2.23 |
| Accel. RMS | 1.00 | 1.09 | 1.04 | 1.41 | 1.59 | 1.00 | 1.16 |
| Crest Factor | 1.00 | 1.00 | 2.44 | 7.12 | 8.76 | 4.12 | 1.00 |
| Low Freq. Rel. | 1.00 | 1.34 | 0.95 | 0.55 | 0.44 | 1.17 | 2.43 |
| Low Freq. Abs. | 1.00 | 1.95 | 1.33 | 1.27 | 1.23 | 1.20 | 3.51 |
| Kurtosis | 0.12 | 0.20 | 0.38 | 3.2 | 3.26 | 0.747 | −0.16 |

TABLE 4

Output Data

| | BearingC | OverAllVibr |
|---|---|---|
| Normal | 1.00 | 1.00 |
| Small Imbalance | 0.53 | 1.30 |
| Strong Imbalance | 0.27 | 1.85 |
| BPFO | 1.65 | 1.59 |
| BPFI | 2.89 | 4.11 |
| BSF | 1.33 | 2.67 |
| Combo | 1.16 | 1.77 |

Kurtosis (KU) in Tables 1–3 was not calculated using baseline. The value of KU increases greatly in bad bearing conditions, but remains low for imbalance conditions. Under the "Strong Imbalance" condition shown in Table 2, the value of KU increased somewhat and was slightly higher than expected. However, the Crest Factor for the same data series is also higher than expected. Thus, it is reasonable to infer that during the trial, the "strong" imbalance caused knocking of the parts in the system and caused an associated increase in the value of KU.

The calculated parameters are generally related and their values depend on a variety of factors. Standing alone, a single output parameter can not be used to predict the condition of the motor. However the combination of the parameters are very useful in the detection of mechanical problems.

The method of the present invention provides a means of monitoring the operating condition of mechanical rotating machinery. The calculated output values are based mainly on the general properties of vibrational signals such as root mean square, kurtosis, and high frequency enveloping.

The method includes the learning mode. (See FIGS. 3–5). During the learning mode, baseline data are collected. The baseline data are saved for the comparison against subsequent operating conditions. Output parameters, overall vibration (OverAllVibr) and bearing condition (BearingC), are calculated from the general properties of the vibrational signals. Overall vibration and bearing condition data are presented in FIG. 2 and Table 4.

The results of the testing showed that overall vibration exhibited noticeable increases when any type of mechanical problems were present. Bearing condition provided a strong indication of the type of mechanical problem exhibited by the machine.

Comparison of the vibration levels with known standards such as NEMA, ISO, and GM together with the method described herein provides a reliable methodology for motor monitoring.

While the specific embodiment has been illustrated and described, numerous modifications come to mind without significantly departing from the spirit of the invention, and the scope of protection is only limited by the scope of the accompanying claim.

We claim:

1. A method for determining the operational condition of a rotary machine, the method comprising the steps of:

monitoring the machine under a baseline operating condition;

collecting baseline vibrational data;

calculating a preselected number of baseline parameters from the baseline vibrational data;

calculating a first baseline operational indicator from the baseline parameters;

storing the baseline parameters and the first baseline operational indicator in a memory location;

monitoring the machine under a subsequent operating condition;

collecting subsequent vibrational data during the subsequent operating condition;

calculating a preselected number of subsequent operating parameters from the subsequent vibrational data;

calculating a first subsequent operational indicator from the preselected number of subsequent operating parameters;

comparing the preselected number of subsequent operating parameters to the preselected number of baseline parameters wherein a difference between the subsequent parameters and the baseline parameters provides an indication of a mechanical problem exhibited by the machine; and comparing the first subsequent operational indicator to the first baseline operational indicator wherein a difference between the first subsequent operational indicator and the first baseline operational indicator provides an indication of a first type of mechanical problem exhibited by the machine.

2. The method of claim 1, wherein the first type of mechanical problem is an overall vibration of the machine.

3. The method of claim 2 further comprising the steps of:

calculating a second baseline operational indicator from the baseline parameters;

storing the second baseline operational indicator in a memory location;

calculating a second subsequent operational indicator from the preselected number of subsequent operating parameters; and comparing the second subsequent operational indicator to the second baseline operational indicator wherein a difference between the second subsequent operational indicator and the second baseline operational indicator provides an indication of a second type of mechanical problem exhibited by the machine.

4. The method of claim 3, wherein the second type of mechanical problem is a bearing condition.

5. The method of claim 1 wherein the collecting baseline vibrational data step includes transforming the baseline vibrational data from time domain to complex frequency domain, and the collecting subsequent vibrational data step includes transforming the subsequent vibrational data from time domain to complex frequency domain.

6. The method of claim 1, wherein the preselected number of baseline parameters and the preselected number of subsequent parameters comprise high frequency enveloping, acceleration root mean square, kurtosis, averaged spectrum changes, low frequency relative change, low frequency absolute change, and crest factor.

7. The method of claim 1 further comprising the step of comparing the subsequent vibrational data to an industry standard value.

8. The method of claim 1 wherein the baseline parameters and the first baseline operational indicator are stored in a read-only memory device.

9. The method of claim 1 wherein the calculating steps and the comparing steps are performed by a microprocessor.

10. A method for determining the operational condition of a rotary machine, the method comprising the steps of, monitoring the machine under a baseline operating condition;

collecting baseline vibrational data;

calculating values from the baseline vibrational data for a preselected number of baseline parameters;

calculating a first baseline operational indicator from the baseline parameter values;

storing the baseline parameter values and the first baseline operational indicator in a memory location;

monitoring the machine under a subsequent operating condition;

collecting subsequent vibrational data during the subsequent operating condition;

calculating values from the subsequent vibrational data for a preselected number of subsequent operating parameters;

calculating a first subsequent operational indicator from the preselected number of subsequent operating parameter values;

comparing the preselected number of subsequent operating parameter values to the preselected number of baseline parameter values wherein a difference between the subsequent parameter values and the baseline parameter values provides an indication of a mechanical problem exhibited by the machine; and comparing the first subsequent operational indicator to the first baseline operational indicator wherein a difference between the first subsequent operational indicator and the first baseline operational indicator provides an indication of a first type of mechanical problem exhibited by the machine.

11. The method of claim 10, wherein the first type of mechanical problem is an overall vibration of the machine.

12. The method of claim 10 further comprising the steps of:

calculating a second baseline operational indicator from the baseline parameters;

storing the second baseline operational indicator in a memory location;

calculating a second subsequent operational indicator from the preselected number of subsequent operating parameters; and comparing the second subsequent operational indicator to the second baseline operational indicator wherein a difference between the second subsequent operational indicator and the second baseline operational indicator provides an indication of a second type of mechanical problem exhibited by the machine.

13. The method of claim 12, wherein the second type of mechanical problem is a bearing condition.

14. The method of claim 10, wherein the preselected number of baseline parameters and the preselected number of subsequent parameters comprise high frequency enveloping, acceleration root mean square, kurtosis, averaged spectrum changes, low frequency relative change, low frequency absolute change, and crest factor.

15. The method of claim 10 further comprising the step of comparing the subsequent vibrational data an industry standard value.

16. A method for determining the operational condition of a rotary machine, the method comprising the steps of:

monitoring the machine under a baseline operating condition;

collecting baseline vibrational data;

calculating values from the baseline vibrational data for a preselected number of baseline parameters;

calculating a first baseline operational indicator from the baseline parameter values;

storing the baseline parameter values and the first baseline operational indicator in a memory location;

calculating a second baseline operational indicator from the baseline parameter values;

storing the baseline parameter values and the first baseline operational indicator in a memory location;

monitoring the machine under a subsequent operating condition;

collecting subsequent vibrational data during the subsequent operating condition;

calculating values from the subsequent vibrational data for a preselected number of subsequent operating parameters;

calculating a first subsequent operational indicator from the preselected number of subsequent operating parameter values;

calculating a second subsequent operational indicator from the preselected number of subsequent operating parameter values;

comparing the preselected number of subsequent operating parameter values to the preselected number of baseline parameter values wherein a difference between the subsequent parameter values and the baseline parameter values provides an indication of a mechanical problem exhibited by the machine;

comparing the first subsequent operational indicator to the first baseline operational indicator wherein a difference between the first subsequent operational indicator and the first baseline operational indicator provides an indication of a first type of mechanical problem exhibited by the machine; and comparing the second subsequent operational indicator to the second baseline operational indicator wherein a difference between the second subsequent operational indicator and the second baseline operational indicator provides an indication of a second type of mechanical problem exhibited by the machine.

17. The method of claim 16, wherein the first type of mechanical problem is an overall vibration of the machine.

18. The method of claim 16, wherein the second type of mechanical problem is a bearing condition.

19. The method of claim 16, wherein the preselected number of baseline parameters and the preselected number of subsequent parameters comprise high frequency enveloping, acceleration root mean square, kurtosis, averaged spectrum changes, low frequency relative change, low frequency absolute change, and crest factor.

* * * * *